United States Patent
Salter et al.

(10) Patent No.: US 12,122,451 B2
(45) Date of Patent: Oct. 22, 2024

(54) ELECTRIFIED VEHICLE TRAILER CHARGING AT SINGLE VEHICLE CHARGING STALLS

(71) Applicant: FORD GLOBAL TECHNOLOGIES, LLC, Dearborn, MI (US)

(72) Inventors: Stuart C. Salter, White Lake, MI (US); Ryan O'Gorman, Beverly Hills, MI (US); Lorne M. Forsythe, Novi, MI (US); Darrel A. Recker, Ypsilanti, MI (US); Peter Phung, Windsor (CA); John R. Van Wiemeersch, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 375 days.

(21) Appl. No.: 17/521,047

(22) Filed: Nov. 8, 2021

(65) Prior Publication Data
US 2023/0145383 A1    May 11, 2023

(51) Int. Cl.
*B62D 13/06*  (2006.01)
*B25J 9/16*  (2006.01)
(Continued)

(52) U.S. Cl.
CPC ........ *B62D 15/0285* (2013.01); *B25J 9/1679* (2013.01); *B60K 35/00* (2013.01);
(Continued)

(58) Field of Classification Search
None
See application file for complete search history.

(56) References Cited

U.S. PATENT DOCUMENTS 8,965,669 B2 * 2/2015 Fisher ................. G06Q 10/047
                                                               701/123
10,000,131 B2 * 6/2018 McNally ................ B60L 53/18
(Continued)

FOREIGN PATENT DOCUMENTS

WO       2013050194 A1     4/2013

OTHER PUBLICATIONS

Bosch, Electromobility for Commercial Vehicles, 2021.
Roberto Baldwin, Towing with an Electric Pickup Might Pose Charging Challenges, Sep. 7, 2020.

*Primary Examiner* — Redhwan K Mawari
*Assistant Examiner* — Kai Wang
(74) *Attorney, Agent, or Firm* — Frank L. Lollo; MacMillan, Sobanski & Todd, LLC

(57) ABSTRACT

A driver assistance system aids a driver in charging one or more trailer-mounted batteries in a trailer being towed by an electrified passenger vehicle. Many existing charging facilities for electric vehicles have charging stalls with a layout configured to accommodate single vehicles. Charging facilities having drive-through or elongated charging stalls able to accommodate larger vehicles which are towing an electrified trailer are much scarcer. When attempting to charge a trailer-mounted battery in a charging stall meant for a single vehicle, it may be necessary to unhitch (i.e., decouple) the trailer while in the charging stall so that the passenger vehicle does not block the aisles of a charging station. Sensors in the vehicle perform a sensor sweep of a selected charging stall, and after unhitching, the trailer uses an independent drive system to park itself in the selected charging stall using driving commands which are calculated from the sensor sweep.

18 Claims, 5 Drawing Sheets

(51) Int. Cl.
  *B60K 35/00* (2006.01)
  *B60L 53/37* (2019.01)
  *B60L 53/66* (2019.01)
  *B62D 15/02* (2006.01)
  *H04W 4/40* (2018.01)
  *B60K 35/80* (2024.01)

(52) U.S. Cl.
  CPC ............... *B60L 53/37* (2019.02); *B60L 53/66* (2019.02); *B62D 13/06* (2013.01); *H04W 4/40* (2018.02); *B60K 35/80* (2024.01); *B60K 2360/55* (2024.01); *B60L 2200/28* (2013.01)

(56) References Cited

U.S. PATENT DOCUMENTS

| | | | |
|---|---|---|---|
| 10,139,238 B2* | 11/2018 | Widmer | G01C 21/3635 |
| 11,001,161 B2* | 5/2021 | Rosene | B60L 50/50 |
| 2011/0114398 A1* | 5/2011 | Bianco | B60K 1/04 |
| | | | 320/109 |
| 2014/0257884 A1* | 9/2014 | Kyoung | G06Q 10/02 |
| | | | 705/5 |
| 2017/0158007 A1* | 6/2017 | Lavoie | B60W 10/30 |
| 2019/0161121 A1* | 5/2019 | Greenwood | B62D 13/06 |
| 2020/0055357 A1* | 2/2020 | Laine | B60D 1/58 |
| 2020/0148068 A1* | 5/2020 | Melatti | B60L 53/60 |
| 2020/0369168 A1 | 11/2020 | Barker et al. | |
| 2021/0365043 A1* | 11/2021 | Chan | G08G 1/164 |
| 2022/0161853 A1* | 5/2022 | Ramirez Llanos | |
| | | | B62D 15/0285 |
| 2022/0371199 A1* | 11/2022 | Schultz | B62D 53/00 |

\* cited by examiner

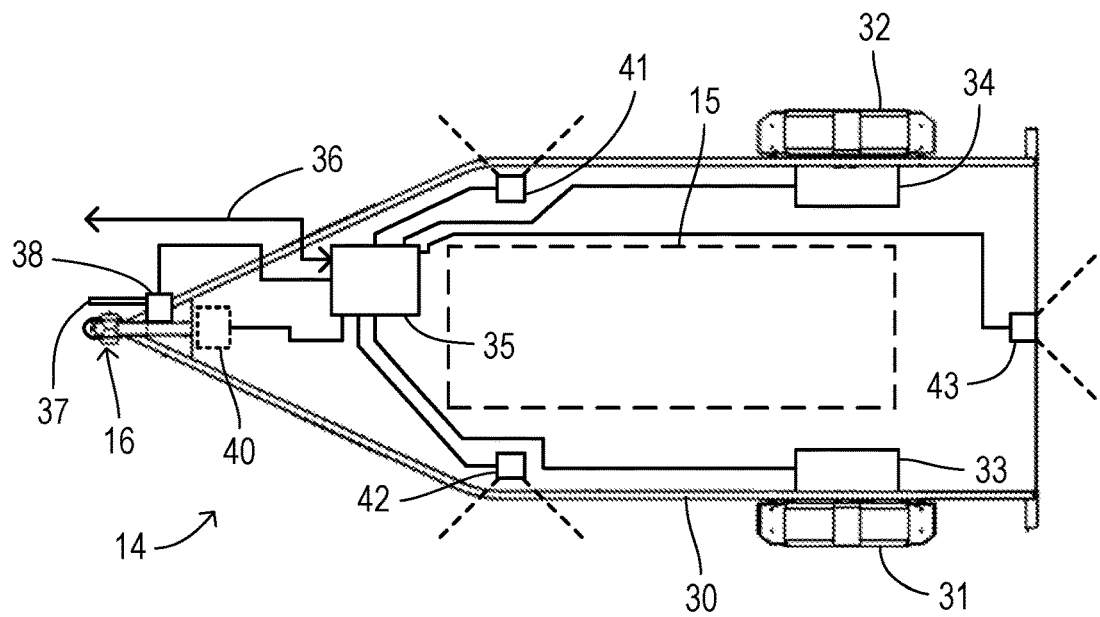
Fig. 5
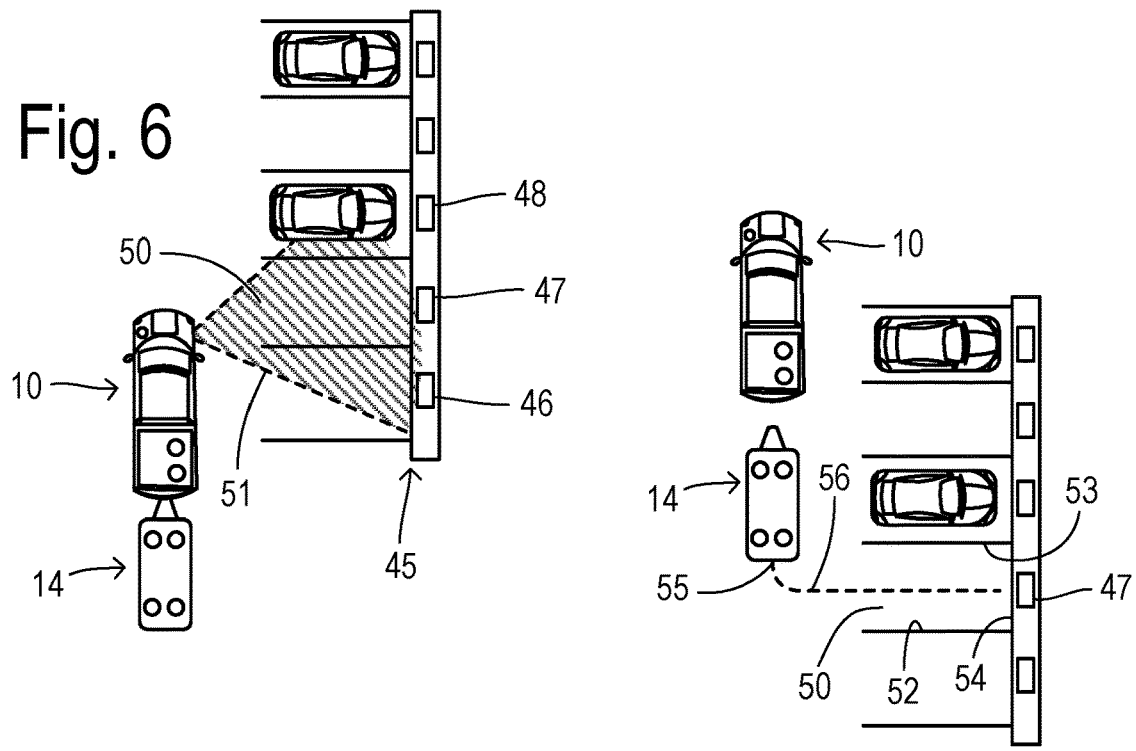
Fig. 6
Fig. 7

ELECTRIFIED VEHICLE TRAILER CHARGING AT SINGLE VEHICLE CHARGING STALLS

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to aiding a driver in charging one or more battery units of an electrified passenger vehicle which is towing a trailer with a trailer-mounted battery unit, and, more specifically, to guiding the trailer to a parking location in a charging stall of a charging facility which requires decoupling of the trailer from the vehicle for recharging.

The level of battery capacity conventionally available on electrified vehicles has led to challenges in providing sufficiently long driving distances (i.e., driving range) before needing to be recharged. In addition to providing adequate driving range, it is desirable that when an electric vehicle is recharged that the time required to reach a desired state of charge be kept short.

Improvements in electrified vehicles have enabled them to be employed in many types of vehicle usage applications, such as towing trailers for expanded cargo capacity or for camping. Such trailers may include supplemental batteries to supply electrical power for use by electrical devices in the trailer and/or as supplemental power for the towing vehicle. In addition, trailers can also be deployed with the sole purpose of providing a secondary battery to supply power to the electrified vehicle which results in extending the driving range before a recharge is needed.

Undertaking a recharging operation while towing a trailer having a secondary battery which will also be recharged leads to added considerations such as 1) the need for a layout at a charging station that accommodates the length of a combined vehicle and trailer, 2) the need for a placement of chargers which can reach the charge ports of the vehicle and trailer, 3) availability of chargers that can deliver charging rates meeting the requirements of the driver, 4) checking for the availability of recharging time at a charging station which is able to accommodate the vehicle/trailer combination and charging objectives, and 5) navigating the vehicle and trailer into a corresponding parking spot once a charging station has been selected. Some vehicles or trailers may have more than one usable charge port or may have multiple charging modes (e.g., charging rates and/or the ability to pass through a charging current to another battery unit, such as from the vehicle to the trailer-mounted battery). Because of the large number of interacting options, it becomes difficult for the driver to easily and conveniently select and implement an optimal recharging task.

A public infrastructure supporting battery charging has been growing as increasing numbers of electric vehicles have come into service for both commercial and personal use. The footprint of parking spaces (i.e., stalls) and the charger outlets arranged beside them are mostly configured for single, passenger-sized vehicles in order to work with the most prominent style of electric vehicles on the road. Perpendicular or angled parking stalls with a single car length may have a charger outlet placed adjacent to an end of the stall opposite from the stall entrance. A smaller number of publicly available charging facilities may include drive-through stalls which are longer in order to accommodate trucks or commercial vehicles, but these may be less readily accessible to a driver of an electrified vehicle which is towing a trailer. Therefore, it would be desirable to make use of charging facilities of the type set up for passenger vehicles alone to instead recharge an electrified trailer and/or electrified passenger vehicle together.

SUMMARY OF THE INVENTION

In one aspect of the invention, an electrified vehicle comprises a rechargeable onboard battery unit storing electrical power for a traction motor used to move the vehicle. The vehicle has a trailer interface configured to communicate with a trailer controller in a trailer that includes a rechargeable trailer-mounted battery unit and a drive control system for independently moving the trailer during parking in a selected charging stall to charge the trailer-mounted battery. The vehicle has at least one sensor configured to characterize the selected charging stall by performing a sensor sweep while proximate to the selected charging stall. The vehicle has a vehicle controller configured to generate a selection of the selected charging stall and to generate a map of the charging stall in response to the sensor sweep. The vehicle controller is configured to calculate a drive sequence of the trailer from a predetermined location where the trailer is unhitched from the vehicle to a target position in the selected charging stall, and to transmit the drive sequence to the trailer controller.

In another aspect of the invention, a method is provided for charging a trailer-mounted battery unit in a trailer being towed by an electrified passenger vehicle. A charging stall is selected at a charging station, wherein the selected charging stall has a size configured for a single vehicle and has a respective charger outlet arranged proximate to the selected charging stall. The passenger vehicle is situated adjacent to the selected charging stall such that at least one sensor of the passenger vehicle is in a position for remotely sensing the selected charging stall. A sensor sweep is performed with at least one sensor while proximate to the selected charging stall. A map is generated of the charging stall in response to the sensor sweep. A drive sequence of the trailer is calculated from a mapped predetermined location where the trailer is unhitched from the vehicle to a mapped target position within the selected charging stall. The drive sequence is transmitted from the passenger vehicle to a trailer controller in the trailer via a trailer interface. A drive control system in the trailer is activated for independently moving the trailer to the mapped target position within the selected charging stall in order to charge the trailer-mounted battery.

BRIEF DESCRIPTION OF THE DRAWINGS

FIG. 5 is a schematic diagram showing an electrified trailer which includes onboard sensors and an independent drive system capable of moving the trailer short distances into or out of a parking space.

FIG. 6 is an overhead view of an electrified vehicle performing a sensor sweep to characterize a charging stall.

FIGS. 7, 8, and 9 are overhead views depicting a sequence of automatic parking of the trailer into a scanned charging stall wherein FIG. 7 shows a starting position of an unhitched trailer and a calculated path for the trailer, FIG. 8 shows the trailer executing the path, and FIG. 9 shows the electrified vehicle moving into a separate charging stall while the trailer charges in the selected stall.

DETAILED DESCRIPTION OF PREFERRED EMBODIMENTS

Figure 1:
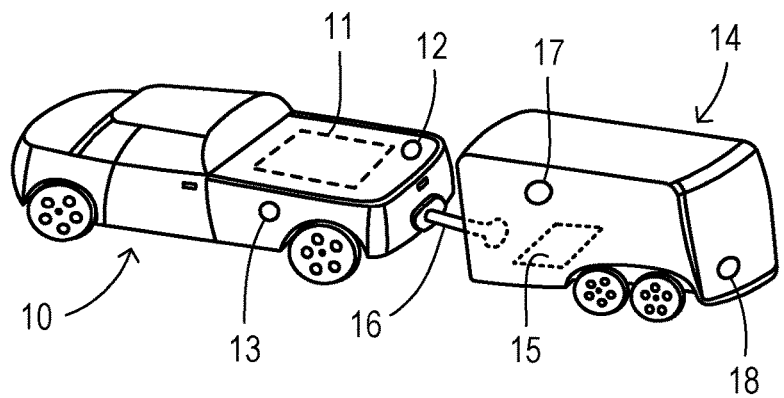
FIG. 1 is a schematic view of an electrified vehicle towing a trailer with a trailer-mounted battery unit.

FIG. 1 shows an electrified vehicle 10 (often referred to as a battery-electric vehicle or BEV) configured as an electric pickup truck. Vehicle 10 has an onboard rechargeable battery unit 11 which stores electrical power for a traction motor (not shown) to propel vehicle 10. The traction motor may comprise an electric machine mechanically coupled to a gearbox which may include a differential. The electric machine may also act as a generator during deceleration to recover energy that would normally be lost as heat in a friction braking system.

Battery unit 11 may be comprised of a multi-cell battery which provides a high voltage, direct current (DC) output. A contactor module may selectably connect battery unit 11 with a high-voltage bus (not shown). A power electronics module (not shown) controls operation of the electric machine and provides the ability to bi-directionally transfer energy between battery unit 11 and the electric machine. The power electronics module may convert the DC voltage to a three-phase AC current to operate the electric machine. In a regenerative mode, the power electronics module may convert the three-phase AC current from the electric machine acting as a generator to a DC voltage for recharging battery unit 11.

Figure 2:
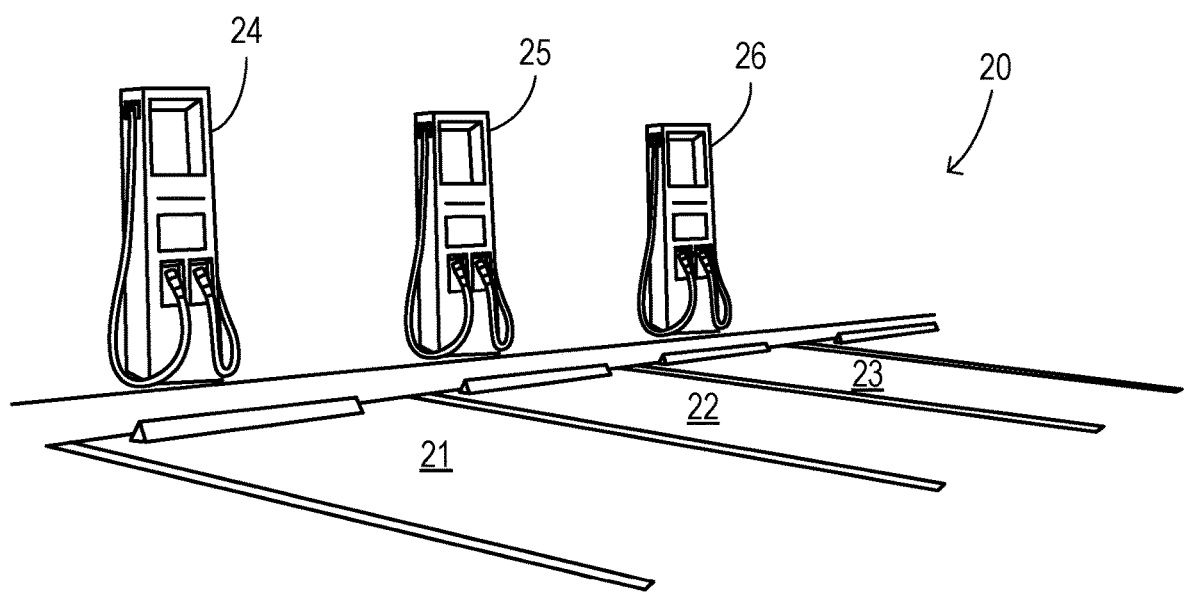
FIG. 2 is a schematic view of an example layout of a charging station with single-vehicle charging stalls.

Vehicle 10 is configured to recharge battery unit 11 from external power sources using one or more charge ports 12 and 13. External power sources may include electrical outlets at private or public locations. Electric vehicle supply equipment (EVSE) for connecting to a vehicle's charging port may include a charger unit at a charging station (i.e., a location having parking stalls or spaces each provided with one or more charger units). A charging station serving a plurality of electrified cars and trucks may be connected to an electrical power distribution network or grid as provided by an electric utility company and may be managed by electronic control systems enabling users to reserve a time period and charger outlet for their use, as described in patent application publication US 2020/0148068A1 and in patent U.S. Pat. No. 11,001,161, which are both incorporated herein by reference. FIG. 2 shows a charging station 20 having parking spaces 21-23 which each has a respective charger unit 24-26, respectively, arranged for use by electric vehicles parked in the spaces.

The EVSE and control systems of the charging station may regulate and manage the transfer of energy between a power source and vehicle 10. Charge ports 12 and 13 may be any type of port configured to transfer power from EVSE to vehicle 10. In some embodiments, charge ports 12 and 13 may be electrically coupled to an on-board power conversion module which provides proper voltage and current levels to battery unit 11. An EVSE connector may have pins that mate with corresponding recesses of charge port 12 or 13. Alternatively, various components described as being electrically coupled or connected may transfer power using a wireless inductive coupling. The use of EVSE for charging BEV batteries is described in patent application publication US 2020/0369168A1, which is incorporated herein by reference.

Returning to FIG. 1, vehicle 10 is hitched together with trailer 14 which includes a respective battery unit 15. The use of trailer 14 may be primarily for the purpose of carrying additional battery capacity for vehicle 10, in which case a trailer hitch 16 may provide both mechanical and electrical connections. In addition to the extra battery capacity, trailer 14 may additionally provide a supplemental cargo space. With or without providing supplemental battery power to vehicle 10, trailer 14 could be configured as a camper or other functional unit which uses the trailer battery to power trailer-mounted devices (e.g., electrical appliances). For charging trailer-mounted battery unit 15, trailer charge ports 17 and 18 are coupled to battery unit 15.

Figure 3:
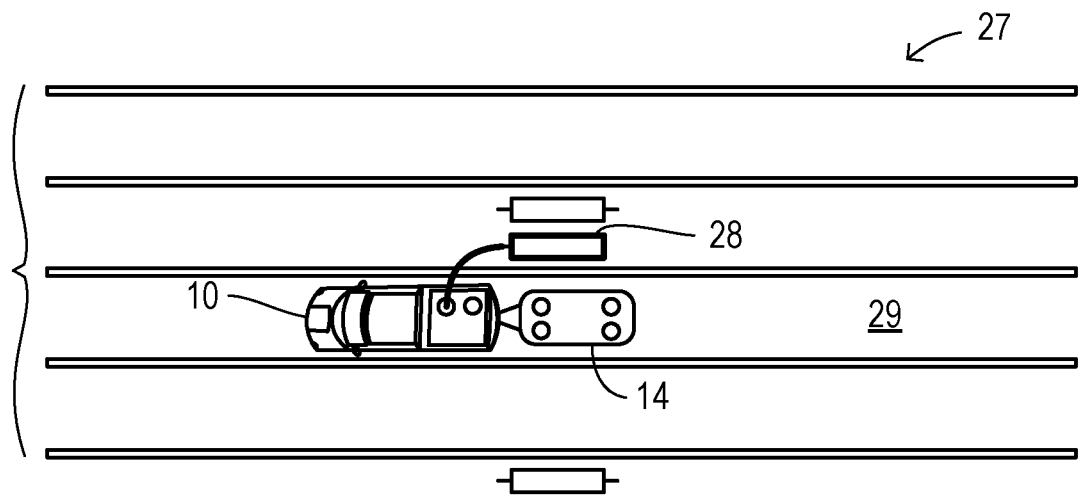
FIG. 3 is an overhead view of a charging station layout having pull-through lanes to accommodate longer vehicles.
Figure 4:
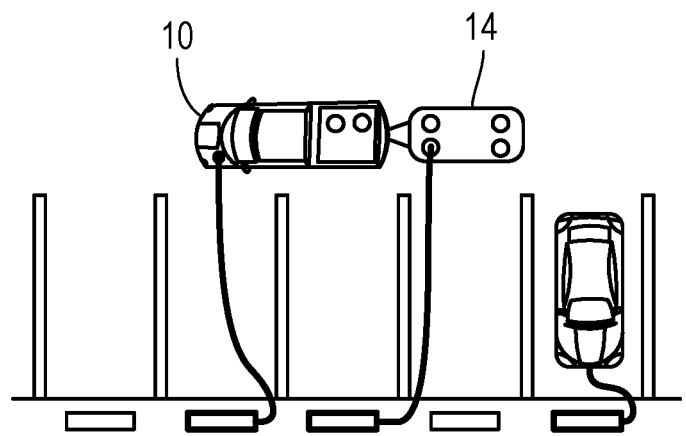
FIG. 4 is an overhead view of an electrified vehicle towing a trailer at a charging station with single-vehicle charging stalls, wherein the vehicle and trailer are being charged without uncoupling the trailer.

FIG. 3 shows a pull-through layout of a charging station 27 having charging outlets deployed adjacent a plurality of pull-through lanes, such as a charging outlet 28 for a corresponding lane 29. Availability of a pull-through lane simplifies charging of trail-mounted battery units, but such an arrangement may be difficult to find when it is needed. Instead, a driver of a combined electric vehicle and trailer may often need to stop for recharging at a charging station with the more commonplace layout which has single-vehicle charging stalls. For the trailer to remain coupled to the passenger vehicle during charging, however, multiple charging stalls and/or access aisles to the stalls may be blocked. Even if such a use of a charging facility is allowed, availability for reserving access to the required number of adjacent stalls may be much more limited. Therefore, uncoupling of a trailer during charging would be desirable. However, many drivers are not comfortable with the maneuvers needed to back a trailer into a stall. Some trailers are available with self-contained drive motors capable of moving a trailer a short distance for parking, sometimes also including sensors for detecting and avoiding obstacles while moving. However, such sensors would be seldom used. To avoid excessive cost, trailer sensors have tended to have low resolution. Therefore, significant driver/user intervention has been needed, and fully automatic operation has been elusive.

FIG. 5 depicts trailer 14 in more detail. A trailer body/chassis 30 supports wheels 31 and 32 which can be driven by electric motors 33 and 34, respectively, using power from battery unit 15. A trailer controller 35 communicates with a controller in the towing vehicle via a communication channel 36 (wired or wireless) to receive data and commands for driving motors 33 and 34 to propel trailer 14 along a desired path.

Trailer 14 has a coupling/jack system 16 for hitching and unhitching trailer 14 to/from the towing vehicle. System 16 can be fully manual or can include a robotic arm 37 controlled by an actuator 38 for automatically engaging or disengaging a ball coupling and a motorized jack unit 40 for automatically extending or retracting a jack wheel. Controller 40 is connected to actuator 38 and unit 40 for coordinating the hitching or unhitching in cooperation with driver commands received from a vehicle controller via communication channel 36.

Trailer 14 may further include a plurality of sensors for monitoring the surrounding environment and obstacles. For example, sensors 41, 42, and 43, which are coupled to trailer controller 35, may be comprised of radar transceiver units, cameras, lidar sensors, acoustic/microphone sensors, and/or ultrasonic units. Data provided by sensors 41-43 can be transmitted to the vehicle controller to assist in mapping a charging stall and/or can be used by trailer controller 35 to prevent collision with nearby (e.g., moving) objects when trailer 14 moves autonomously and/or to monitor automatic operation of coupling/jack system 16.

A procedure for using a charging station or other facility to charge a trailer-mounted battery unit may begin with identifying or selecting a charging stall to be used by the trailer. A charging stall can be selected remotely using a reservation scheme as described in patent application publication US 2020/0148068A1 and in patent U.S. Pat. No. 11,001,161, for example. Alternatively, a charging stall can be selected without a reservation by manually inputting the selection using a user interface in the vehicle. For example, the driver may navigate the vehicle to approach a desired charging stall such that the charging stall become visible within a camera view from a vehicle-mounted camera. By displaying the camera view on a touchscreen display, the driver can tap on the display at a spot corresponding to the desired charging stall.

Once a selection for a particular charging stall is available, remote sensing is used to map an absolute or relative location of the selected charging stall. As shown in FIG. 6, a row of charging stalls 45 with corresponding charger outlets (e.g., charger outlets 46-48) is laid out as single-vehicle stalls. A selected or target stall 50 has been selected for use to charge trailer 14. Using one or more remote sensing units, vehicle 10 performs a sensor sweep 51 of an area around and including selected stall 50 with vehicle 10 positioned proximate to stall 50. Depending upon the capabilities of the vehicle-mounted sensors (and potentially the capabilities of any trailer-mounted sensors being used), sensor sweep 51 may be conducted from a fixed position or while moving. Features detected by sensor sweep 51 may include stall boundaries (e.g., painted lines on the ground detected optically using a camera, or a curb detected by reflection of a radar or ultrasonic pulse), the placement and configuration of a charger unit (e.g., detected optically), vehicles parked in adjacent stalls, and the like. Data from sensor sweep 51 can be compiled as a map fixing the features of the stall to a position of the vehicle and/or trailer. Based on the map, a vehicle controller examines the stall boundaries and the location of the charger unit to identify a target position for parking the trailer to be charged.

As shown in FIG. 7, vehicle 10 tows trailer 14 to a predetermined location 55 to be used as an entrance into selected charging stall 50. At predetermined location 55, trailer 14 is uncoupled from vehicle 10 (either manually or automatically). The map compiled by a vehicle controller includes a representation of stall side lines 52 and 53 and a front boundary (e.g., curb) 54. The map also defines location 55 and a drive path 56 to be traversed by trailer 14 to move it from location 55 to the target position when it can be hooked up with charger unit 47.

Figure 8:
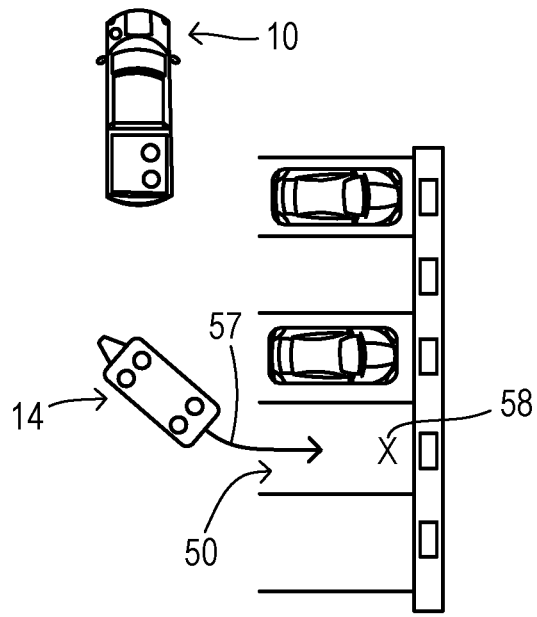
Figure 9:
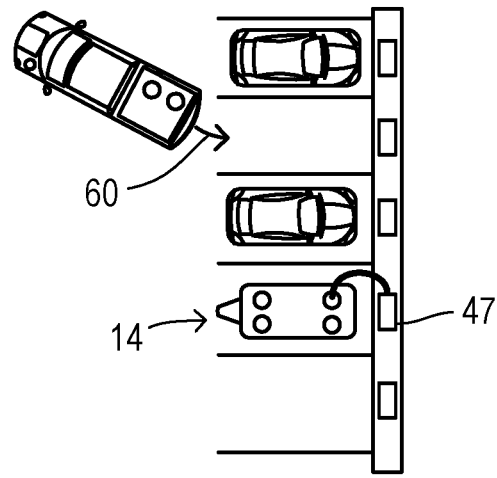

A sequence of driving commands which are calculated by a vehicle controller are transmitted to a trailer controller. FIG. 8 shows trailer 14 being self-propelled using differential wheel rotation to execute a curve 57 along drive path 56 to target position 58 in selected stall 50. FIG. 9 shows trailer 14 backed into selected stall 50 and connected to charger unit 47, while uncoupled vehicle 10 separately moves along a path 60 into another charging stall. Alternatively, vehicle 10 could temporarily drive away in order perform other errands while trailer 14 is charging.

Figure 10:
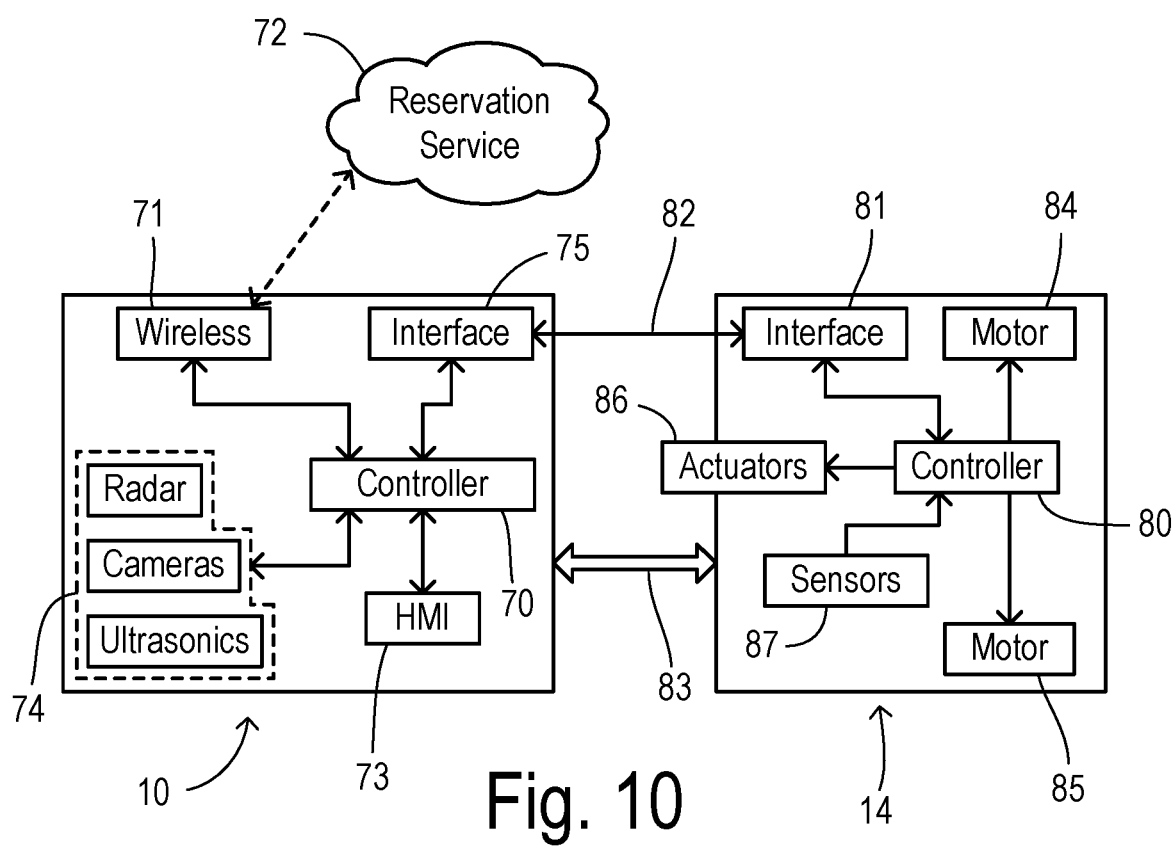
FIG. 10 is a schematic block diagram showing a vehicle and trailer according to an embodiment of the invention.

FIG. 10 is a block diagram showing one embodiment of a vehicle, trailer, and remote reservation system. Vehicle 10 has a controller 70 (e.g., electronic module) with a programmable microprocessor and a program memory for storing software programs to perform the procedures described herein. Controller 70 may communicate with offboard resources using a wireless transceiver 71. Cellular data communications or other wireless data protocols can be used by transceiver 71 to communicate with a cloud network 72 containing a server or other components for creating a reservation service. Vehicle 10 has a human machine interface (HMI) 73 for interacting with a driver during various steps in a process of selecting a charging stall and parking a trailer in the selected stall. HMI 73 may include a touchscreen display. The HMI can additionally or alternatively include a touchscreen or other control elements mounted on trailer 14 and/or a smartphone or other mobile computing device. In addition to accessing reservation service 72 and/or manually identifying a charging stall, the touchscreen display can be used to provide messages to a driver relating to any manual steps needed during hitching or unhitching trailer 14. Sensors 74 in vehicle 10 may include radar transceivers, optical or infrared cameras, lidar, acoustic/microphone sensors, and/or ultrasonic sensors.

Vehicle 10 has an interface 75 connected to vehicle controller 70 providing a communication channel 82 to an interface 81 in trailer 14 which is connected to a trailer controller 80. Channel 82 may be a wireless link according to a known standard such as Bluetooth®, WiFi, or ultra-wideband (UWB). In addition to communication channel 82, vehicle 10 and trailer 14 are connected mechanically and/or electrically by a hardware connection 83.

Trailer 14 includes motors 84 and 85 coupled to wheels on opposite sides of trailer 14. Motors 84 and 85 are controlled independently using commands in a drive sequence received by controller 80 from vehicle 10 over channel 82 in order to steer trailer 14 along a desired path. Actuators 86 (e.g., a robotic arm for manipulating the hitch mechanism and a servomechanism for lowering/raising a jack wheel) may be provided in association with a trailer hitch mechanism and a jack wheel unit for embodiments with automatic hitching/unhitching of trailer 14.

Figure 11:
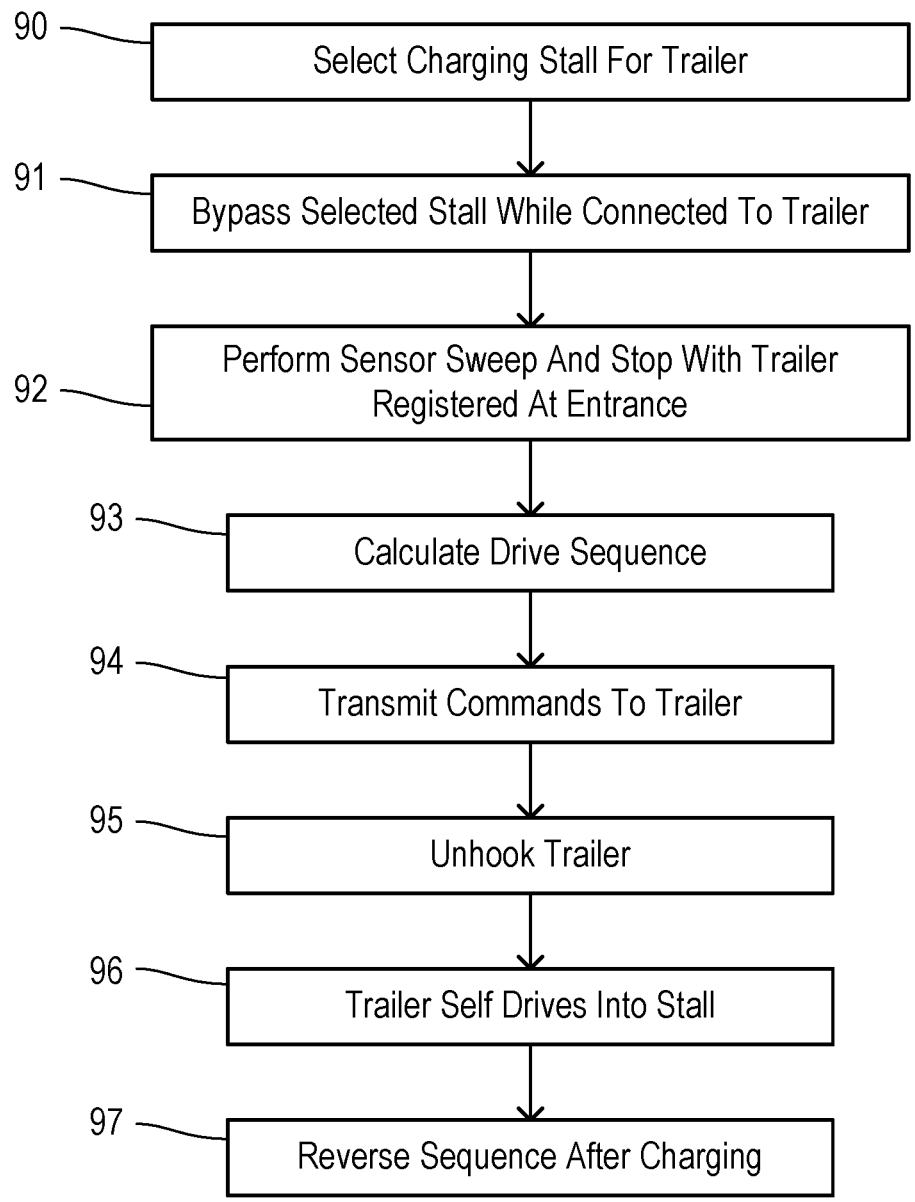
FIG. 11 is a flowchart showing one preferred method according to the invention.

FIG. 11 provides a flowchart for one embodiment of a method of the invention. In step 90, a charging stall is selected for use in charging the trailer. The selection can include enrolling a reservation of the selected stall or can include a manual selection of a charging stall by the driver of the vehicle. In step 91, the vehicle is situated at (i.e., arrives at) the selected charging stall while towing the trailer. The vehicle/trailer combination can stop proximate to the selected charging stall or can drive by (i.e., bypass) the selected stall as it performs a sensor sweep in step 92 to create a map defining the selected stall. Based on the compiled map, the vehicle then proceeds to and stops at a predetermined (mapped) position at which the trailer becomes registered at the entrance to the selected charging stall (i.e., aligned with the selected stall such that the self-contained driving system on the trailer can easily navigate to the target location).

In step 93, a controller in the vehicle calculates a drive sequence to be used by the trailer to park at the target location. The drive sequence may include 1) commands for a robotic arm and/or jack-wheel servomechanism in order to automatically uncouple from the vehicle, and 2) parking commands specifying rotations of the trailer wheels which will move the trailer to the target position. In step 94, the drive sequence is transmitted to the trailer controller. The trailer is unhooked from the vehicle in step 95. Alternatively, the trailer could be uncoupled before transmitting the drive sequence in step 94 provided that the communication channel is wireless.

In step 96, the trailer self-drives into the selected stall and stops when the target position is obtained. The trailer can then be hooked up to the corresponding charger unit and charging is commenced.

After charging, the trailer is unhooked from the charger unit. In order to re-couple to the vehicle, the drive sequence that was originally used to park the trailer at the target position can be executed in reverse to move the trailer back to the same position where it was unhitched from the vehicle. Then the vehicle can be backed up to the trailer and the two can be re-hitched (either manually or automatically using appropriate commands to the robotic arm and/or jack-wheel servomechanism).

What is claimed is:

1. An electrified vehicle comprising:
   a rechargeable onboard battery unit storing electrical power for a traction motor used to move the vehicle;
   a trailer interface configured to communicate with a trailer controller in a trailer that includes a rechargeable trailer-mounted battery unit and a drive control system for independently moving the trailer during parking in a selected charging stall to charge the trailer-mounted battery;
   at least one sensor configured to characterize the selected charging stall by performing a sensor sweep while proximate to the selected charging stall; and
   a vehicle controller configured to:
     generate a selection of the selected charging stall;
     generate a map of the selected charging stall in response to the sensor sweep;
     determine a target position in the selected charging stall for charging the rechargeable trailer-mounted battery unit;
     determine a registered location of the trailer and the electrified vehicle which is proximate the selected charging stall such that the trailer can navigate to the target position;
     calculate a drive sequence of the trailer from the registered location where the trailer is unhitched from the vehicle to the target position in the selected charging stall, wherein the drive sequence further comprises reversal commands which move the trailer back to the registered location; and
     transmit the drive sequence to the trailer controller;
   wherein the electrified vehicle is configured to approach the trailer at the registered location to be re-hitched after charging the rechargeable trailer-mounted battery unit and the trailer returns to the registered location using the reversal commands.

2. The electrified vehicle of claim 1 wherein the vehicle controller generates the selection by enrolling a reservation for the selected charging stall using a remote reservation service.

3. The electrified vehicle of claim 1 further comprising:
   a human machine interface (HMI) configured to receive an input from an occupant of the vehicle identifying the selection.

4. The electrified vehicle of claim 1 wherein the map is generated relative to a reference location corresponding to a geographic position of the vehicle during the sensor sweep, and wherein the map defines the registered location proximate to an entrance to the selected charging stall.

5. The electrified vehicle of claim 1 wherein the map defines stall boundaries for the selected charging stall and a location of a respective charger unit, and wherein the vehicle controller is further configured to identify the target position in response to the location of the respective charger unit and the stall boundaries.

6. The electrified vehicle of claim 1 wherein the trailer includes a robotic arm associated with a hitch for coupling the trailer to the vehicle, and wherein the drive sequence includes commands to the robotic arm for unhitching the trailer from the vehicle.

7. The electrified vehicle of claim 1 wherein the drive sequence includes parking commands specifying rotations of wheels of the trailer which move the trailer to the target position.

8. The electrified vehicle of claim 1 wherein the at least one sensor comprises at least one of a radar unit, a camera, a lidar sensor, an acoustic sensor, and an ultrasonic distance sensor.

9. The electrified vehicle of claim 1 wherein the trailer interface comprises a wireless communication channel.

10. A method of charging a trailer-mounted battery unit in a trailer being towed by an electrified passenger vehicle, comprising the steps of:
   selecting a charging stall at a charging station, wherein the selected charging stall has a size configured for a single vehicle and has a respective charger outlet arranged proximate to the selected charging stall;
   situating the passenger vehicle adjacent to the selected charging stall such that at least one sensor of the passenger vehicle is in a position for remotely sensing the selected charging stall;
   performing a sensor sweep with the at least one sensor while proximate to the selected charging stall;
   generating a map of the charging stall in response to the sensor sweep;
   determining a target position in the selected charging stall for charging the rechargeable trailer-mounted battery unit;
   determining a registered location of the trailer and the electrified vehicle which is proximate the selected charging stall such that the trailer can navigate to the target position;
   calculating a drive sequence of the trailer from the registered location where the trailer is unhitched from the vehicle to the target position within the selected charging stall, wherein the drive sequence further comprises reversal commands which move the trailer back to the registered location;
   transmitting the drive sequence from the passenger vehicle to a trailer controller in the trailer via a trailer interface;
   activating a drive control system in the trailer for independently moving the trailer to the target position within the selected charging stall in order to charge the trailer-mounted battery;
   activating the drive control system in the trailer for independently moving the trailer back to the registered location after charging the rechargeable trailer-mounted battery unit; and driving the electrified vehicle to approach the trailer at the registered location to be re-hitched after charging the rechargeable trailer-mounted battery unit.

11. The method of claim 10 wherein the step of selecting a charging stall is comprised of enrolling a reservation for the selected charging stall using a remote reservation service.

12. The method of claim 10 wherein the step of selecting a charging stall is comprised of receiving an input from an occupant of the vehicle in order to identify the selection using a human machine interface (HMI).

13. The method of claim 10 wherein the map is generated relative to a reference location corresponding to a geographic position of the vehicle during the sensor sweep, and wherein the map defines the registered location proximate to an entrance to the selected charging stall.

14. The method of claim 10 wherein the map defines stall boundaries for the selected charging stall and a location of a respective charger unit, and wherein the step of calculating the drive sequence includes identifying the target position in response to the location of the respective charger unit and the stall boundaries.

15. The method of claim 10 wherein the trailer includes a robotic arm associated with a hitch for coupling the trailer to the passenger vehicle, and wherein the drive sequence comprises commands to the robotic arm for unhitching the trailer from the vehicle.

16. The method of claim 10 wherein the drive sequence includes parking commands specifying rotations of wheels of the trailer which move the trailer to the target position.

17. The method of claim 10 wherein the at least one sensor comprises at least one of a radar unit, a camera, a lidar sensor, an acoustic sensor, and an ultrasonic distance sensor.

18. The method of claim 10 wherein the trailer interface comprises a wireless communication channel.

* * * * *